(12) United States Patent
Kodama et al.

(10) Patent No.: US 6,403,234 B1
(45) Date of Patent: Jun. 11, 2002

(54) PLATED MATERIAL FOR CONNECTORS

(75) Inventors: Atsushi Kodama; Kazuhiko Fukamachi, both of Kanagawa (JP)

(73) Assignee: Nippon Mining & Metals Co., Ltd., Tokyo (JP)

( * ) Notice: Subject to any disclaimer, the term of this patent is extended or adjusted under 35 U.S.C. 154(b) by 0 days.

(21) Appl. No.: 09/593,416

(22) Filed: Jun. 14, 2000

(30) Foreign Application Priority Data

Jun. 14, 1999 (JP) ............................................. 11-167058
Feb. 28, 2000 (JP) ........................................ 2000-051103

(51) Int. Cl.[7] .......................... B32B 15/20; B32B 15/01
(52) U.S. Cl. ....................... 428/675; 428/648; 428/610; 439/886; 439/887
(58) Field of Search .................................. 439/886, 887; 428/629, 648, 675, 941, 610, 929; 200/266, 268, 269

(56) References Cited

U.S. PATENT DOCUMENTS 4,549,043 A * 10/1985 Kalubowila et al. .... 174/133 R
5,849,424 A * 12/1998 Sugawara et al. .......... 428/674
5,916,695 A * 6/1999 Fister et al. ................ 428/647

* cited by examiner

Primary Examiner—Deborah Jones
Assistant Examiner—Andrew T Piziali
(74) Attorney, Agent, or Firm—Arent Fox Kintner Plotkin & Kahn

(57) ABSTRACT

A plated material for connectors, having superior insertion and withdrawal properties, comprises an intermediate layer consisting of Ni alloy plating having a Vickers hardness of 450 to 750 Hv and a thickness of 0.3 to 2 $\mu$m provided on a base metal consisting of Cu or Cu alloy, a reflowed Sn or Sn alloy plated surface layer provided thereon, and an alloy layer consisting primarily of Sn—Ni and having a thickness of 0.05 to 2 $\mu$m formed by diffusion between the intermediate layer and the surface layer, in which average grain size of said Sn—Ni compound is 0.05 to 1 $\mu$m.

7 Claims, No Drawings

PLATED MATERIAL FOR CONNECTORS

TECHNICAL FIELD

The present invention relates to a Sn plated material for terminals and contacts in connectors, and more particularly, relates to a Sn plated material in which less insertion force is necessary when the material is employed as a connector.

BACKGROUND ART

Sn plated materials, in which Sn is plated on Cu or Cu alloy, are widely used for contacts (electrodes), such as connectors for automobiles.

These Sn plated materials are produced by continuously plating in a Sn coating line and are generally produced by a method as described below. A strip of Cu alloy plating base metal such as brass or phosphor bronze is degreased and pickled as a pretreatment, Cu substrate plating is formed on the base metal by an electroplating method as an intermediate layer, or no intermediate layer is provided thereon, and subsequently, a Sn plating layer is formed on the surface thereof. As a method for forming the Sn plating layer, a method in which reflow (heat-melting) treatment is carried out after plating is mainly employed. This is because whiskers are not produced on the reflowed Sn plated material, etc.

Cu alloy strip in which Sn is plated is pressed into the shape of a contact at a connector manufacturer and is molded with resin, thereby forming a connector. These Sn plated connectors are employed primarily for electrical wiring parts for automobiles at present.

However, in connectors formed of Sn plated material, it is noted that a large insertion force must be applied when the connector is connected. In assembly lines for automobiles, the connectors are usually manually connected at present. Therefore, in the case in which the insertion force necessary for the connector is too large, workers on the assembly line are burdened thereby, and it is also possible that work-related health problems will occur.

Since Sn is a soft metal, a Sn film produces a sliding resistance when a contact point is slid on the Sn film. Therefore, in the Sn plated terminals or connectors, insertion and withdrawal force necessary therefor is higher than that for Au plated connectors, etc.

Recently, connectors tend to have multiple cores, whereby insertion force necessary therefor is increased. Therefore, there is a much stronger demand to decrease the insertion force necessary for connectors.

DISCLOSURE OF INVENTION

The present invention was made in view of the above-described circumstances, and it is an object thereof to provide a Sn or Sn alloy plated material for terminals or connectors in which the insertion force necessary for connector assembly can be reduced.

As a result of the inventors' research to solve the above problems, the present invention provides a plated material for connectors having superior insertion and withdrawal properties, comprising: an intermediate layer consisting of Ni or Ni alloy plating having a Vickers hardness of 450 to 750 Hv and a thickness of 0.3 to 2 µm provided on a base metal consisting of Cu or Cu alloy; a reflowed Sn or Sn alloy plated surface layer provided thereon; and an alloy layer consisting primarily of Sn—Ni and having a thickness of 0.05 to 2 µm formed by diffusion between the intermediate layer and the surface layer, in which average grain size of Sn—Ni compound is 0.05 to 1 µm.

According to an embodiment of the present invention, an intermediate layer is made of an alloy consisting of P in an amount of 0.05 to 15% by weight; B, Zn, and Cu, in a total amount of 50% by weight or less; and the balance consisting of Ni and inevitable impurities, or consisting of Ni, Co, and inevitable impurities.

Furthermore, according to another embodiment of the present invention, the content of at least one of P and B in Sn or Sn alloy plating measured by Glow Discharge Mass Spectrometry (GDMS) is 0.001 to 0.2% by weight in total.

Moreover, according to another embodiment of the present invention, the content of at least one of P and B in an oxide layer formed on the surface of a Sn or Sn alloy plating layer by diffusion from the inside is 0.001 to 0.1% by weight in total.

It was found that the insertion force necessary for connector can be reduced according to the present invention.

As described above, since Sn is a soft metal, a Sn film produces sliding resistance when a contacted point (metal) is slid on Sn plating. The higher the hardness of the substrate, the smaller this function (lubricating property of a metallic thin film). Therefore, when a Sn plated connector has a hard substrate, the insertion force necessary therefor is reduced. In the present invention, a Ni alloy intermediate layer having suitable hardness is formed as a substrate for the Sn or Sn alloy plating, whereby the insertion force necessary for the connector is reduced. A plated material according to the present invention is satisfactory as long as an alloy layer containing Ni exists under the Sn or Sn alloy plating layer at the surface. That is to say, the present invention is effective even if another plating layer exists between the Ni alloy layer and the base metal consisting of Cu alloy.

As a Ni alloy intermediate layer, Ni alloy (or Ni—Co alloy) containing at least one of P and B may be mentioned. Ni—P alloy (or Ni—P—B alloy, etc.) plating has a Vickers hardness of 450 to 750 Hv and has a hardness suitable for decreasing the insertion force necessary for connectors. Furthermore, in Sn plated material having this intermediate layer, P or B diffused to the surface of Sn plating by reflow (heating) process in Sn plating lines, and a film consisting of P compound or B compound, is formed at the surface. P compounds, etc., have lubricating effects, whereby this film works as a lubricating film and the insertion force necessary for connectors is reduced without increasing contact resistance at the surface of the Sn plating.

The hardness of the intermediate layer is preferably 450 to 750 Hv. When the hardness is less than 450 Hv, the insertion force necessary for connectors is not satisfactorily decreased. In contrast, when it exceeds 750 Hv, defects such as plating cracks, etc., occur during pressing.

It is necessary that the thickness of the intermediate layer be 0.3 µm or more, and it is more preferable that it be 1.0 µm or more. When the thickness is less than 0.3 µm, the above insertion force decreasing effect is lessened. Since pressing properties are inferior when the thickness is too great, the upper limit therefor is preferably up to 2 µm. Moreover, structures having multiple plating layers can be constituted by forming another plating layer, for example, a Cr plating layer, etc., between an intermediate layer and a base metal.

When the Sn plating having a Ni alloy intermediate layer is reflowed (heated), an alloy layer consisting primarily of Ni—Sn is formed between the Sn plating layer and the intermediate layer by diffusing Ni. This alloy layer also affects the insertion force necessary for connectors as does the intermediate layer. The thickness of this alloy layer is preferably 0.05 to 2 µm. The insertion force necessary for connectors increases when the thickness is less than 0.05

μm, and the contact resistance in connectors in high temperature environments may be easily increased when it exceeds 2 μm.

In the alloy layer, crystals of Ni—Sn compound are generated and the average grain size of these crystals is 0.05 to 1 μm. The insertion force necessary for connectors increases when the average grain size is less than 0.05 μm, and the contact resistance may be easily increased when it exceeds 1 μm. The thickness of the alloy layer and the average grain size can be adjusted by controlling the heating temperature and the heating period during plating reflow processing.

Of elements constituting the intermediate layer, Ni or Co is a base element for adding P, B, Cu, or Zn in the intermediate layer, and can be alloy-plated with each element. An alloying ratio in a Ni—Co alloy can be optionally chosen. Furthermore, as a function of Ni or Co, there is also a suppressive effect for diffusing Cu in Sn plating, that is to say, an effect in which Cu is prevented from diffusion to Sn plating and oxidizing, whereby increase in contact resistance thereof is suppressed.

The content of P and B in the intermediate layer may be determined depending on the insertion and withdrawal properties required. It is desirable that the content be more suitably 0.5% by weight or more, since the effect is not obtained when the content is less than 0.05% by weight. The upper limit at which P or B can be alloy-plated with Ni (or Ni—Co alloy) is 20% by weight. It is difficult to contain more P or B. When the content of P and B exceeds 15% by weight, the tensile stress in the plating film increases or plating cracking easily occurs during pressing, whereby the pressing properties are inferior. Therefore, it is more desirable that the content be 15% by weight or less.

As another added element in addition to P and B, Cu and Zn may be mentioned. In the case in which the pressing property is further improved by adjusting hardness, etc., of Ni—P, Ni—Co—P, Ni—B, or Ni—Co—B plating film, Cu and Zn may be added, as necessary. In this case, at least one of Cu and Zn is contained at 50% by weight or less. When the content exceeds 50% by weight, the suppressive effect for diffusing Cu, which is the original effect of Ni or Co, is not maintained, and the contact resistance in connectors in high temperature environments readily increases.

The content of at least one of P and B in the surface layer is 0.001 to 0.2% by weight as measured by depth direction concentration profile measurement using Glow Discharge Mass Spectrometry (GDMS). The GDMS measurement was carried out at a discharge voltage of 1.0 kV, discharge current of 2 mA, acceleration voltage of 8.3 kV, and argon sputtering, using VG9000 type produced by VG Elemental Co., as a measuring device. When the P content in the surface layer is less than 0.001% by weight, the lubricating effect is insufficient, and the insertion force is not reduced. In contrast, when the content exceeds 0.2% by weight, plating appearance after the reflow treatment is inferior. The plating layer at the surface can consist of an alloy plating such as Sn—Pb alloy (solder), Sn—Ag alloy, Sn—Bi, etc., in addition to Sn plating. The corrosion resistance and the lubricity of the Sn plating may be improved by carrying out sealing after the Sn plating process. When the thickness of the Sn or Sn alloy plating layer at the surface is less than 0.3 μm, the plating appearance after the reflow treatment is inferior. In contrast, when the thickness exceeds 3 μm, the insertion force necessary for the connectors is increased. Therefore, it is desirable that the thickness of the Sn or Sn alloy plating layer range from 0.3 to 3 μm.

An oxide layer is naturally formed at the surface in the Sn or Sn alloy plating layer. However, in the case in which an intermediate layer consists of Ni—P or Ni—B alloy plating, P or B diffuses from the inside of the surface layer to the surface, whereby P or B is contained in the above oxide layer. The oxide layer containing this P or B prevents oxygen from permeating from the atmosphere to the inside of the plating, whereby increase of the contact resistance is suppressed. The content of P or B in the oxide layer preferably ranges from 0.001 to 0.1% by weight. When the content is less than 0.001% by weight, a protective effect for increasing the contact resistance is small. In contrast, when it exceeds 0.1% by weight, the plating appearance is readily degraded. The content of P or B is measured by the above-mentioned GDMS.

As a plating solution for the intermediate layer, $NiSO_4$—$NiCl_2$—$H_3PO_4$—$H_2PHO_3$ type or $NiSO_4$—$NiCl_2$—$CoSO_4$—$H_3PO_4$—$H_2PHO_3$ type can be employed in basic Ni—P alloy plating or Ni—Co—P alloy plating, respectively. The $H_3PO_4$ is a pH buffer. As a Ni plating solution, a solution in which $H_2PHO_3$ is added to the well-known Watt bath can be employed. The $H_2PHO_3$ controls the P content in the plating film by changing the addition amount.

However, the composition and condition of the plating bath in each plating in this application can be optionally chosen. B, Cu, and Zn can be alloyed by respectively adding metal salts such as borane amine complex (as a source which supplies B in the plating film), $CuSO_4$, $SnSO_4$, and $ZnSO_4$ in a small amount, as an alloying element in addition to P. Since Cu has a higher natural potential than others, a complexing agent is used in the addition of Cu. Glycine added as a complexing agent forms eutectoids of Ni and Cu. The complexing agent must be suitably chosen depending on the pH of the plating bath. However, effects of the present invention are not limited in any way by the selection of these conditions.

As a method for Sn or Sn alloy plating at the surface, a well-known plating bath, a methanesulfonic acid bath, etc., may be used.

The present invention is not limited by plating conditions of the intermediate layer or the surface layer, and it is effective under any plating conditions.

BEST MODE FOR CARRYING OUT THE INVENTION

Effects of the present invention are specifically explained based on this embodiment. As a plating base metal, a tough pitch copper (Japanese Industrial Standard C1100) and a brass (Japanese Industrial standard C1020) having a thickness of 0.3 mm, which were degreased and pickled, were employed. Intermediate layers of these materials were plated by each alloy shown in claims, and these materials were employed for evaluating. Surface layers of these materials were plated by Sn and Sn-10% Pb alloy, and these materials were employed for evaluation.

Plating conditions of a Ni—P type and types to which Cu, or Zn were added thereto are shown in Tables 1 to 3.

TABLE 1

Ni-P Alloy Plating Conditions

| | Conditions | |
|---|---|---|
| Plating Solution Composition | $NiSO_4$ | 150 g/L |
| | $NiCl_2$ | 45 g/L |
| | $H_3PO_4$ | 50 g/L |
| | $H_2PHO_3$ | 0.25~10 g/L |
| Plating Solution Temperature | 70° C. | |
| Current Density | 10 A/dm² | |
| Plating Thickness | 1.5 μm | |

TABLE 2

Ni-P-Cu Alloy Plating Conditions

| | Conditions | |
|---|---|---|
| Plating Solution Composition | $NiSO_4$ | 100 g/L |
| | $CuSO_4$ | 10 g/L |
| | Glycine | 30 g/L |
| | $H_3PO_4$ | 25 g/L |
| | $H_2PHO_3$ | 0.25~10 g/L |
| Plating Solution Temperature | 25° C. | |
| Current Density | 2 A/dm$^2$ | |
| Plating Thickness | 1.5 μm | |

TABLE 3

Ni-P-Zn Alloy Plating Conditions

| | Conditions | |
|---|---|---|
| Plating Solution Composition | $NiSO_4$ | 150 g/L |
| | $ZnSO_4$ | 20 g/L |
| | $Na_2SO_4$ | 150 g/L |
| | $H_3PO_4$ | 40 g/L |
| | $H_2PHO_3$ | 0.25~10 g/L |
| Plating Solution Temperature | 70° C. | |
| Current Density | 10 A/dm$^2$ | |
| Plating Thickness | 1.5 μm | |

Plating conditions of a Ni—Co—P type are shown in Table 4.

TABLE 4

Ni-Co-P Alloy Plating Conditions

| | Conditions | |
|---|---|---|
| Plating Solution Composition | $NiSO_4$ | 150 g/L |
| | $NiCl_2$ | 45 g/L |
| | $CoCl_2$ | 50 g/L |
| | $H_3PO_4$ | 50 g/L |
| | $H_2PHO_3$ | 0.25~10 g/L |
| Plating Solution Temperature | 70° C. | |
| Current Density | 10 A/dm$^2$ | |
| Plating Thickness | 1.5 μm | |

Plating conditions of a Ni—P—B type and types to which Cu, or Zn were added thereto are shown in Tables 5 to 7.

TABLE 5

Ni-P-B Alloy Plating Conditions

| | Conditions | |
|---|---|---|
| Plating Solution Composition | $NiSO_4$ | 150 g/L |
| | $NiCl_2$ | 45 g/L |
| | $H_3PO_4$ | 50 g/L |
| | $H_2PHO_3$ | 0.25~10 g/L |
| | Borane Dimethylamine Complex | 0.5~1.0 g/L |
| Plating Solution Temperature | 50° C. | |
| Current Density | 5 A/dm$^2$ | |
| Plating Thickness | 1.5 μm | |

TABLE 6

Ni-P-B-Cu Alloy Plating Conditions

| | Conditions | |
|---|---|---|
| Plating Solution Composition | $NiSO_4$ | 100 g/L |
| | $CuSO_4$ | 10 g/L |
| | Glycine | 30 g/L |
| | $H_3PO_4$ | 25 g/L |
| | $H_2PHO_3$ | 0.25~10 g/L |
| | Borane Dimethylamine Complex | 0.5~1.0 g/L |
| Plating Solution Temperature | 25° C. | |
| Current Density | 2 A/dm$^2$ | |
| Plating Thickness | 1.5 μm | |

TABLE 7

Ni-P-B-Zn Alloy Plating Conditions

| | Conditions | |
|---|---|---|
| Plating Solution Composition | $NiSO_4$ | 150 g/L |
| | $ZnSO_4$ | 20 g/L |
| | $Na_2SO_4$ | 150 g/L |
| | $H_3PO_4$ | 40 g/L |
| | $H_2PHO_3$ | 0.25~10 g/L |
| | Borane Dimethylamine Complex | 0.5~1.0 g/L |
| Plating Solution Temperature | 50° C. | |
| Current Density | 3 A/dm$^2$ | |
| Plating Thickness | 1.5 μm | |

Plating conditions of Sn or Sn—Pb alloy plating of the surface layer are shown in Tables 8 to 9.

TABLE 8

Sn Plating Conditions

| | Conditions | |
|---|---|---|
| Plating Solution Composition | Methane-sulfonic acid | 100 g/L |
| | Tin Methane-sulfonate (20%) | 200 g/L |
| | Surfactant | 5 g/L |
| Plating Solution Temperature | 40° C. | |
| Current Density | 7.5 A/dm$^2$ | |
| Plating Thickness | 0.1~5 μm | |

TABLE 9

Sn-Pb Plating Conditions

| | Conditions | |
|---|---|---|
| Plating Solution Composition | Methane-sulfonic acid | 100 g/L |
| | Lead Oxide | 5 g/L |
| | Tin Methane-sulfonate (20%) | 200 g/L |
| | Surfactant | 5 g/L |
| Plating Solution Temperature | 40° C. | |
| Current Density | 7.5 A/dm$^2$ | |
| Plating Thickness | 0.1~5 μm | |

In these plated materials, plating composition, thickness, and hardness of an intermediate layer; thickness and average grain size of an alloy layer which exists between an intermediate layer and a surface layer; and plating composition and thickness of a surface layer, and P content in a surface layer, are shown in Table 10. As comparative materials, a material in which hardness or thickness of an intermediate layer is altered, a material in which an intermediate layer consists of Ni alloy, and a material in which thickness or average grain size of an alloy layer is altered, were prepared. Plating composition and thickness of these comparative materials are also shown in Table 10.

As evaluation criteria for the plated material, evaluation of plating appearance after reflow treatment, measurement of terminal insertion force, evaluation of pressing property, and measurement of contact resistance of plated material after heating, were carried out. With respect to the plating appearance after reflow treatment, the plating surface was inspected visually and confirmed the existence of plating repelling. Each evaluating material was punched in shapes of 1 mm×10 mm, whereby a male terminal was formed. The male terminal was inserted in a female terminal (Sn plating at the surface) available commercially, and the terminal insertion force thereof was measured using a connector inserting and withdrawing measuring device (model 1310D1, produced by Aiko Engineering Co.). If the terminal insertion force of the evaluation material was 150 g or less, it was judged that the insertion force was small and there is no problem. The evaluation materials were heated in air to 155° C. for 500 hours, the contact resistance after heating was measured by using contact simulator: CRS-113-Au type, produced by Yamasaki Seiki Laboratory. If the contact resistance value of the evaluation materials after heating was 10 mΩ or less, it was judged that the contact resistance would not significantly increase even if the evaluation material is used in environments above room temperature.

The evaluated results of each plated material are shown in Table 11.

TABLE 10

Thickness of Alloy Layer in Evaluated Plated Material, etc.

| No. | Plated Base Metal | Intermediate Layer Composition (wt %) | Thickness of Intermediate Layer (μm) | Hardness of Intermediate Layer (Hv) | Thickness of Alloy Layer (μm) | Average Grain Size of Alloy Layer (μm) | Surface layer Composition (wt %) | P and B contents in Surface Layer (wt %) | P and B contents in Oxide Layer (wt %) |
|---|---|---|---|---|---|---|---|---|---|
| Example | | | | | | | | | |
| 1 | C2600 | Ni—2.5P | 1.0 | 600 | 0.7 | 0.3 | Sn | 0.02 | 0.012 |
| 2 | C1100 | Ni—2.5P | 1.0 | 600 | 0.7 | 0.3 | Sn | 0.02 | 0.015 |
| 3 | C2600 | Ni—2.5P | 1.0 | 600 | 0.7 | 0.3 | Sn—10P | 0.02 | 0.014 |
| 4 | C2600 | Ni—1.0P | 1.0 | 450 | 0.7 | 0.3 | Sn | 0.01 | 0.006 |
| 5 | C2600 | Ni—15P | 1.0 | 700 | 0.7 | 0.3 | Sn | 0.08 | 0.05 |
| 6 | C2600 | Ni—2.5P | 1.0 | 600 | 0.07 | 0.3 | Sn | 0.02 | 0.014 |
| 7 | C2600 | Ni—2.5P | 2.0 | 600 | 1.8 | 0.3 | Sn | 0.02 | 0.013 |
| 8 | C2600 | Ni—2.5P | 0.2 | 600 | 0.1 | 0.3 | Sn | 0.02 | 0.017 |
| 9 | C2600 | Ni—2.5P | 1.0 | 600 | 0.7 | 0.06 | Sn | 0.02 | 0.014 |
| 10 | C2600 | Ni—2.5P | 1.0 | 600 | 0.7 | 0.9 | Sn | 0.02 | 0.013 |
| 11 | C2600 | Ni—2.5P—2.5B | 1.0 | 680 | 0.6 | 0.25 | Sn | 0.03 | 0.021 |
| 12 | C2600 | Ni—10Co—2.5P | 1.0 | 610 | 0.5 | 0.35 | Sn | 0.01 | 0.007 |
| 13 | C2600 | Ni—10Zn—2.5P | 1.5 | 540 | 0.6 | 0.3 | Sn | 0.02 | 0.014 |
| 14 | C2600 | Ni—10Cu—2.5P | 0.7 | 550 | 0.6 | 0.3 | Sn | 0.02 | 0.012 |
| 15 | C2600 | Ni—45Zn—2.5P | 5.0 | 450 | 0.6 | 0.3 | Sn | 0.01 | 0.008 |
| 16 | C2600 | Ni—0.03P | 1.5 | 450 | 0.7 | 0.3 | Sn | 0.0007 | 0.0005 |
| 17 | C2600 | Ni—18P | 1.5 | 750 | 0.7 | 0.3 | Sn | 0.25 | 0.16 |
| Comparative Example | | | | | | | | | |
| 18 | C2600 | Ni | 1.0 | 350 | 0.7 | 0.3 | Sn | 0 | 0 |
| 19 | C2600 | Ni—0.03P | 1.0 | 400 | 0.7 | 0.3 | Sn | 0.0006 | 0.0003 |
| 20 | C2600 | Ni—25P | 1.0 | 800 | 0.7 | 0.3 | Sn | 0.28 | 0.18 |
| 21 | C2600 | Ni—2.5P | 0.1 | 600 | 0.7 | 0.3 | Sn | 0.02 | 0.011 |
| 22 | C2600 | Ni—2.5P | 3.0 | 600 | 0.7 | 0.3 | Sn | 0.02 | 0.015 |
| 23 | C2600 | Ni—2.5P | 1.0 | 600 | 0.02 | 0.3 | Sn | 0.02 | 0.013 |
| 24 | C2600 | Ni—2.5P | 1.0 | 600 | 2.5 | 0.3 | Sn | 0.02 | 0.014 |
| 25 | C2600 | Ni—3P | 1.0 | 600 | 0.7 | 0.02 | Sn | 0.02 | 0.013 |
| 26 | C2600 | Ni—3P | 1.0 | 600 | 0.7 | 2.0 | Sn | 0.02 | 0.014 |

TABLE 11

Evaluating Results of Plated Material

| No. | Intermediate layer Composition (wt %) | Thickness of Intermediate layer (μm) | Hardness of Intermediate layer (Hv) | Plating Appearance ① | Insertion Force of Terminal (g) | Pressing Property ② | Contact Resistance after Heating (mΩ) |
|---|---|---|---|---|---|---|---|
| Example | | | | | | | |
| 1 | Ni—2.5P | 1.0 | 600 | ◉ | 135 | ◉ | 9 |
| 2 | Ni—2.5P | 1.0 | 600 | ◉ | 132 | ◉ | 10 |
| 3 | Ni—2.5P | 1.0 | 600 | ◉ | 130 | ◉ | 8 |

TABLE 11-continued

Evaluating Results of Plated Material

| No. | Intermediate layer Composition (wt %) | Thickness of Intermediate layer (μm) | Hardness of Intermediate layer (Hv) | Plating Appearance ① | Insertion Force of Terminal (g) | Pressing Property ② | Contact Resistance after Heating (mΩ) |
|---|---|---|---|---|---|---|---|
| 4 | Ni—1.0P | 1.0 | 450 | ⊚ | 140 | ⊚ | 11 |
| 5 | Ni—15P | 1.0 | 700 | ⊚ | 118 | ⊚ | 8 |
| 6 | Ni—2.5P | 1.0 | 600 | ⊚ | 139 | ⊚ | 7 |
| 7 | Ni—2.5P | 2.0 | 600 | ⊚ | 123 | ⊚ | 7 |
| 8 | Ni—2.5P | 0.2 | 600 | ⊚ | 141 | ⊚ | 14 |
| 9 | Ni—2.5P | 1.0 | 600 | ⊚ | 140 | ⊚ | 8 |
| 10 | Ni—2.5P | 1.0 | 600 | ⊚ | 128 | ⊚ | 13 |
| 11 | Ni—2.5P—2.5B | 1.0 | 680 | ⊚ | 131 | ⊚ | 8 |
| 12 | Ni—10Co—2.5P | 1.0 | 610 | ⊚ | 133 | ⊚ | 9 |
| 13 | Ni—10Zn—2.5P | 1.5 | 540 | ⊚ | 136 | ⊚ | 11 |
| 14 | Ni—10Cu—2.5P | 0.7 | 550 | ⊚ | 138 | ⊚ | 15 |
| 15 | Ni—45Zn—2.5P | 5.0 | 450 | ○ | 144 | ⊚ | 17 |
| 16 | Ni—0.03P | 1.5 | 450 | ○ | 145 | ⊚ | 18 |
| 17 | Ni—18P | 1.5 | 750 | ○ | 100 | ⊚ | 6 |
| Comparative Example | | | | | | | |
| 18 | Ni | 1.0 | 350 | ⊚ | 185 | ⊚ | 35 |
| 19 | Ni—0.03P | 1.0 | 400 | ⊚ | 165 | ⊚ | 30 |
| 20 | Ni—25P | 1.0 | 800 | ○ | 120 | X | 15 |
| 21 | Ni—2.5P | 0.1 | 600 | ⊚ | 183 | ⊚ | 45 |
| 22 | Ni—2.5P | 3.0 | 600 | ⊚ | 125 | X | 8 |
| 23 | Ni—2.5P | 1.0 | 600 | ⊚ | 170 | ⊚ | 10 |
| 24 | Ni—2.5P | 1.0 | 600 | ⊚ | 130 | ○ | 40 |
| 25 | Ni—3P | 1.0 | 600 | ⊚ | 175 | ⊚ | 12 |
| 26 | Ni—3P | 1.0 | 600 | ⊚ | 137 | ○ | 44 |

① Plating Appearance

⊚: Plating has superior appearance.
○: Plating is partially repelled.
X: Plating is repelled over entire surface.

② Pressing Properties

⊚: Plating has no cracking at press-bending portion, and no burrs.
○: Plating cracking is slight at press-bending portions, and burrs slightly form at edges.
X: Plating cracking occurs at press-bending portions, and burrs form at edges.

Consequently, it is apparent that all plated materials according to the present invention are superior to any of the comparative materials.

As described above, according to the present invention, a plated material for connectors having superior insertion and withdrawal properties can be provided.

What is claimed is:

1. A plated material for connectors having superior insertion and withdrawal properties comprising:
    an intermediate layer consisting of Ni alloy plating and at least one of P and B and having a Vickers hardness of 450 to 750 Hv and a thickness of 0.3 to 2 μm provided on a base metal consisting of Cu or Cu alloy;
    a reflowed Sn or Sn alloy plated surface layer provided thereon; and
    an alloy layer consisting primarily of Sn—Ni and having a thickness of 0.05 to 2 μm formed by diffusion between said intermediate layer and said surface layer, in which average grain size of said Sn—Ni compound is 0.05 to 1 μm.

2. A plated material for connectors having superior insertion and withdrawal properties, according to claim 1, wherein said intermediate layer is made of an alloy consisting of at least one of P and B, in a total amount of 0.05 to 20% by weight;
    at least one of Zn and Cu in a total amount of 50% by weight or less; and
    the balance consisting of Ni and inevitable impurities, or consisting of Ni, Co, and inevitable impurities.

3. A plated material for connectors having superior insertion and withdrawal properties, according to claim 1, wherein the content of at least one of P and B in Sn or Sn alloy plating measured by Glow Discharge Mass Spectrometry is 0.001 to 0.2% by weight in total.

4. A plated material for connectors having superior insertion and withdrawal properties, according to claim 2, wherein the content of at least one of P and B in Sn or Sn alloy plating measured by Glow Discharge Mass Spectrometry is 0.001 to 0.2% by weight in total.

5. A plated material for connectors having superior insertion and withdrawal properties, according to claim 1, the content of at least one of P and B in an oxide layer formed on the surface of a Sn or Sn alloy plating layer by diffusion from the inside is 0.001 to 0.1% by weight in total.

6. A plated material for connectors having superior insertion and withdrawal properties, according to claim 2, the content of at least one of P and B in an oxide layer formed on the surface of a Sn or Sn alloy plating layer by diffusion from the inside is 0.001 to 0.1% by weight in total.

7. A plated material for connectors having superior insertion and withdrawal properties, according to claim 3, the content of at least one of P and B in an oxide layer formed on the surface of a Sn or Sn alloy plating layer by diffusion from the inside is 0.001 to 0.1% by weight in total.

* * * * *